(12) United States Patent
Aaron et al.

(10) Patent No.: US 9,357,085 B2
(45) Date of Patent: *May 31, 2016

(54) METHODS, SYSTEMS, AND PRODUCTS FOR MONITORING SERVICE USAGE

(71) Applicant: AT&T Intellectual Property I, L.P., Atlanta, GA (US)

(72) Inventors: Jeffrey A. Aaron, Atlanta, GA (US); Jun-Gang Alin, Duluth, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/752,847

(22) Filed: Jun. 27, 2015

(65) Prior Publication Data

US 2015/0304507 A1    Oct. 22, 2015

Related U.S. Application Data

(63) Continuation of application No. 14/169,212, filed on Jan. 31, 2014, now Pat. No. 9,100,310, which is a continuation of application No. 13/227,509, filed on Sep. 8, 2011, now Pat. No. 8,644,469, which is a continuation of application No. 12/619,057, filed on Nov. 16, 2009, now Pat. No. 8,036,351, which is a continuation of application No. 10/928,338, filed on Aug. 27, 2004, now Pat. No. 7,620,162.

(51) Int. Cl.
*H04M 15/00* (2006.01)
*G06Q 30/02* (2012.01)
(Continued)

(52) U.S. Cl.
CPC ....... *H04M 15/8257* (2013.01); *G06Q 30/0267* (2013.01); *G06Q 30/0269* (2013.01); *G06Q 30/0283* (2013.01); *G06Q 30/04* (2013.01); *H04L 12/14* (2013.01); *H04L 43/0876* (2013.01); *H04M 3/36* (2013.01); *H04M 15/00* (2013.01); *H04M 15/41* (2013.01); *H04M 15/44* (2013.01); *H04M 15/49* (2013.01); *H04M 15/58* (2013.01); *H04M 15/67* (2013.01); *H04M 15/70* (2013.01); *H04M 15/73* (2013.01); *H04M 15/745* (2013.01); *H04W 4/26* (2013.01); *H04M 2215/0104* (2013.01); *H04M 2215/0108* (2013.01); *H04M 2215/0164* (2013.01); *H04M 2215/0188* (2013.01); *H04M 2215/46* (2013.01); *H04M 2215/70* (2013.01); *H04M 2215/7072* (2013.01); *H04W 88/02* (2013.01)

(58) Field of Classification Search
CPC .......... H04L 43/0876; G06Q 30/0267; G06Q 30/0269; G06Q 30/0283; G06Q 30/04; H04M 3/36; H04M 15/00; H04M 15/41; H04M 15/44; H04M 15/49; H04M 15/58; H04M 15/70; H04M 15/73; H04M 15/745; H04M 2215/0104; H04M 2215/0108
USPC ............. 379/32.01, 32.04, 88.11, 88.12, 111, 379/112.01, 112.04, 112.06, 112.07, 379/112.08, 114.01, 114.13, 114.17, 379/121.01, 121.02, 121.03, 121.04, 122, 379/127.01; 455/405, 406, 407, 408, 412.2, 455/414.1, 418; 370/352
See application file for complete search history.

(56) References Cited

U.S. PATENT DOCUMENTS 5,517,555 A    5/1996    Amadon et al.
5,627,886 A    5/1997    Bowman
(Continued)

*Primary Examiner* — Binh Tieu
(74) *Attorney, Agent, or Firm* — Scott P. Zimmerman, PLLC

(57) ABSTRACT

Usage information is received that describes usage of communication services by a communications device. The usage information is compared to monitoring criteria. When the monitoring criteria are satisfied, an electronic notification message is sent to the communications device before an additional charge is incurred.

20 Claims, 3 Drawing Sheets

(51) Int. Cl.
*G06Q 30/04* (2012.01)
*H04M 3/36* (2006.01)
*H04L 12/26* (2006.01)
*H04L 12/14* (2006.01)
*H04W 4/26* (2009.01)
*H04W 88/02* (2009.01)

(56) References Cited

U.S. PATENT DOCUMENTS

| | | | |
|---|---|---|---|
| 5,937,037 A | 8/1999 | Kamel et al. | |
| 5,960,071 A | 9/1999 | Smith | |
| 6,044,260 A | 3/2000 | Eaton et al. | |
| 6,125,173 A | 9/2000 | Jagadish et al. | |
| 6,965,764 B2* | 11/2005 | Plush | H04M 15/00 379/111 |
| 7,280,818 B2 | 10/2007 | Clayton | |
| 7,420,920 B2 | 9/2008 | True et al. | |
| 7,650,137 B2 | 1/2010 | Jobs et al. | |
| 7,650,157 B2 | 1/2010 | Clayton | |
| 7,657,250 B2 | 2/2010 | Clayton | |
| 8,073,119 B2 | 12/2011 | Bevente et al. | |
| 8,130,793 B2 | 3/2012 | Edwards et al. | |
| 8,396,450 B2 | 3/2013 | Clayton | |
| 8,660,917 B2 | 2/2014 | Menezes et al. | |
| 2003/0185374 A1 | 10/2003 | Baker | |
| 2003/0212634 A1* | 11/2003 | Alloune | G06Q 20/102 705/40 |
| 2004/0006478 A1 | 1/2004 | Alpdemir et al. | |
| 2004/0087300 A1 | 5/2004 | Lewis | |
| 2004/0149252 A1 | 8/2004 | Udy | |
| 2004/0215508 A1 | 10/2004 | Rebenack et al. | |
| 2004/0215536 A1 | 10/2004 | Deliwala et al. | |
| 2004/0224661 A1* | 11/2004 | Pericas | G06Q 20/102 455/406 |
| 2005/0027624 A1 | 2/2005 | Cai | |
| 2005/0053211 A1* | 3/2005 | Bevente | H04M 15/00 379/121.02 |
| 2005/0243984 A1 | 11/2005 | Mahone et al. | |
| 2005/0266825 A1* | 12/2005 | Clayton | H04W 4/12 455/407 |
| 2006/0121879 A1* | 6/2006 | Tseitlin | H04M 15/00 455/406 |
| 2007/0149252 A1 | 6/2007 | Jobs et al. | |
| 2007/0174452 A1 | 7/2007 | Nixon et al. | |
| 2007/0214083 A1* | 9/2007 | Jones | G06Q 20/10 705/41 |
| 2008/0069324 A1* | 3/2008 | Bevente | H04M 15/00 379/114.22 |

\* cited by examiner

METHODS, SYSTEMS, AND PRODUCTS FOR MONITORING SERVICE USAGE

CROSS-REFERENCE TO RELATED APPLICATIONS

This application is a continuation of U.S. patent application Ser. No. 14/169,212 filed Jan. 31, 2014 and since issued as U.S. Pat. No. 9,100,310, which is a continuation of U.S. patent application Ser. No. 13/227,509 filed Sep. 8, 2011 and since issued as U.S. Pat. No. 8,644,469, which is a continuation of U.S. patent application Ser. No. 12/619,057 filed Nov. 16, 2009 and since issued as U.S. Pat. No. 8,036,351, which is a continuation of U.S. patent application Ser. No. 10/928,338 filed Aug. 27, 2004 and since issued as U.S. Pat. No. 7,620,162, with all applications incorporated herein by reference in their entireties.

FIELD OF THE INVENTION

The present invention relates generally to data processing systems, and more particularly, to data services provided to a user.

BACKGROUND OF THE INVENTION

The present invention is described in greater detail in the following non-limiting Examples. Services, such as telecommunications or other data services, may be billed on a "pay-per-use" basis. For example, a customer may be charged a rate per minute for the use of long distance telephone service or an amount may be charged for a given number of minutes of use. Video or audio media may be obtained by a customer for a fee based on the quantity of the media that is received. Customers are typically billed periodically for such services, such as with monthly billing. In order to monitor the usage of a particular service, the customer may track the amount of service that he or she uses. If the customer does not track the amount of services used or is incorrect about the amount of services used, the customer may receive a bill for services that is larger than expected at the end of a billing cycle.

It may be difficult or inconvenient for a customer to accurately track how much service is being used. Customers may also receive several types of services through more than one communications system or service provider. The number of services received by a customer can add to the difficulty in tracking the monetary charges that the customer can expect at the end of a billing cycle. In addition, several members of a household or business unit may share the same billing account, and tracking usage by several different members of the household or business may require coordination between members that is difficult or not practical.

SUMMARY OF THE INVENTION

According to embodiments of the present invention, methods, systems, and computer program products provide monitoring of the usage of a plurality of services. In some embodiments, monitoring criteria corresponding to a usage quantity for at least one communication service is received. Service usage information for the service is received. The service usage information and the monitoring criteria are compared. An electronic notification message is sent when the monitoring criteria for one or more of the plurality of services is satisfied.

According to some embodiments of the present invention, monitoring criteria is received that corresponds to a usage quantity for a plurality of services. Each of the plurality of services is provided over ones of a plurality of different communication systems. Actual service usage information is received for the plurality of services. The actual service usage information and the monitoring criteria are compared. An electronic notification message is sent when the monitoring criteria for one or more of the plurality of services is satisfied.

As will further be appreciated by those of skill in the art, although described above primarily with reference to method aspects, the present invention may be embodied as methods, apparatus/systems and/or computer program products. Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
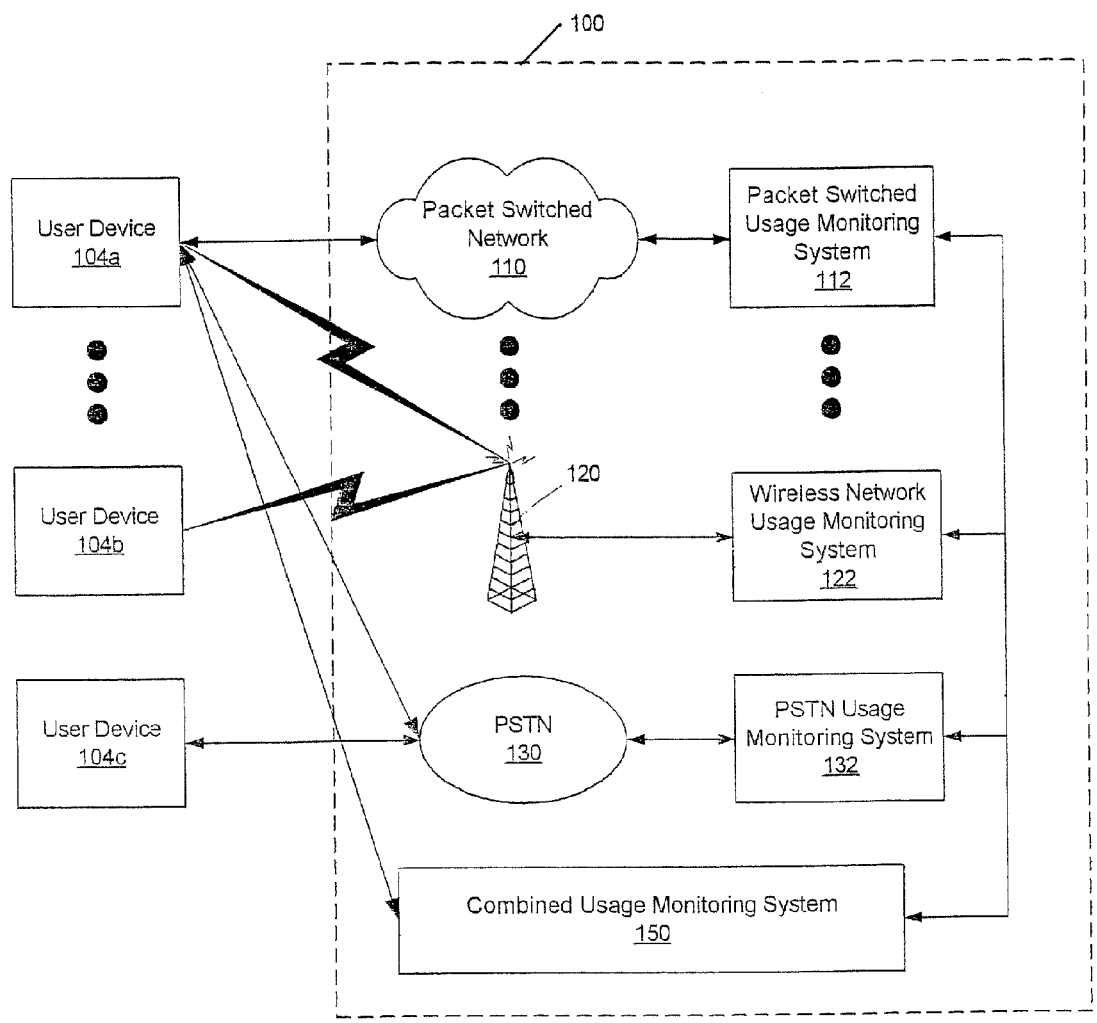
FIG. 1 is a block diagram of systems according to embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numerals refer to like elements throughout.

According to some embodiments of the present invention, substantially real-time actual service usage information for a plurality of services can be monitored. The service usage information can be compared to monitoring criteria. The monitoring criteria can be a set of preferences and/or usage threshold levels. When the monitoring criteria for one or more of the services is satisfied, a notification message can be sent to the user. Accordingly, a plurality of services that may be provided over a plurality of different communications systems may be monitored. Notification that the monitoring criteria has been satisfied may be automatically sent to a user. Users of the provided services may receive information about the amount of services used to reduce the risk of receiving unexpected charges for services.

As will be appreciated by one of skill in the art, the present invention may be embodied as methods, systems and/or computer program products. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD- ROMs, optical storage devices, a transmission media such as those supporting the Internet or an intranet, or magnetic storage devices.

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 illustrates systems according to various embodiments of the present invention. As illustrated, a data information system 100 includes a plurality of communication systems, such as a packet switched network 110, a wireless communications network 120 and a public switched telephone network (PSTN) 130. The packet switched network 110, the wireless communications network 120 and the public switched telephone network 130 communicate with one or more user devices 104a-104c to provide various communications services. The packet switched network 110, the wireless communications network 120 and the public switched telephone network 130 also communicate with a packet switched usage monitoring system 112, a wireless network usage monitoring system 122, and a PSTN usage monitoring system 132, respectively. A combined usage monitoring system 150 is in communication with the monitoring systems 112, 122, and 132 and one or more of the user devices 104a-104c.

Accordingly, information about substantially real-time actual service use by one or more of the user devices 104a-104c can be monitored by the monitoring systems 112, 122, and 132 and received by the combined usage monitoring system 150. It should be understood that "real-time" actual service use includes information that is substantially or near real-time. The combined usage monitoring system 150 can include monitoring criteria, such as usage threshold amounts. The users of the user devices 104a-104c may be notified by the combined usage monitoring system 150 when one or more of the monitoring criteria is satisfied.

Although the data information system 100 in FIG. 1 is illustrated with respect to the packet switched network 110, the wireless communications network 120, and the PSTN 130, any one or more different communications systems may be used. Additional communication networks may also be provided. It should be understood that a single user device 104a may be used, or any number of user devices 104a-104c may be used. The user devices 104a-104c can communicate with one or more of the networks 110, 120, and 130, the combined usage monitoring system 150, and/or other ones of the devices 104a-104c directly or indirectly via other devices, systems, or networks. Any suitable user device may be used for the user devices 104a-104c, including mobile communications devices, desktop computers, landline telephones, modem-enabled devices, set top boxes, cable-enabled television sets, or other devices that can access a communications system. Mobile communications devices can include radiotelephones or other handheld devices, such as a personal wirelessly enabled digital assistants (personal data assistants (PDAs), such as Palm Pilot™ or a Pocket PC™), cellular telephones and/or data terminals, pagers, wireless messaging devices (such as a Blackberry™ wireless handheld device), laptop computers, wireless enabled laptop computers, other mobile communications devices and/or combinations thereof.

Usage monitoring systems, such as the packet switched usage monitoring system 112, the wireless network usage monitoring system 122, and the PSTN usage monitoring system 132, can be configured to monitor usage of one or more services provided over one or more of the networks 110, 120, and 130, respectively, to the user devices 104a-104c. The services provided to the user devices 104a-104c can include data services, such as network access services or media services that are accessible via a network. The services can include downloadable or streamlined electronic audio media, electronic video media, computer network services (e.g., Internet access or email), wireless computer network services, telephone services via a wireless network, video conferencing services, and/or telephone services via a PSTN. The usage monitoring systems 112, 122, and 132 can monitor one or more types of services provided via the corresponding networks 110, 120, and 130.

Although the networks 110, 120, and 130 are illustrated in FIG. 1 as each having a corresponding usage monitoring system 112, 122, and 132 associated therewith, it should be understood that more than one usage monitoring system may be associate with a single network. For example, the packet switched usage monitoring system 112 can monitor the usage as an amount of access to the packet switched network 110 (e.g., the amount of time that a user is logged onto the Internet), and another usage monitoring system can monitor how much of a different service is used during the access period, such as how many audio or video files (e.g., MP3 or JPEG files) are downloaded. Moreover, although the usage monitoring systems 112, 122, and 132 are illustrated as part of the data information system 100, the usage monitoring systems 112, 122, and 132 can be carried out at least in part by one or more of the user devices 104a-104c.

A single user can access several different communication services, including data services, from one or more of the devices 104a-104c. Various services can be received at the same time. For example, a user can receive Internet access services at the device 104a and the user can download audio files via the device 104a using a different service while the device 104a is connected to the Internet. More than one of the devices 104a-104c can be used at the same time. For example, a user could use one of the devices 104a-104c (e.g., a computer) to access the packet switched network 110, such as to view a webpage, at the same time as the user uses another one of the devices 104a-104c (e.g., a cellular telephone) to access the wireless communications network 120, such as to conduct a telephone call.

ore than one user can be associated with the same billing account and the services used by each of the users can be monitored. The cumulative services used by all of the users can be monitored and/or the service usage can be monitored for each of the users separately. The devices 104a-104c may each be associated with a single user or the users may use the devices 104a-104c interchangeably, for example, using a user identifier or account to identify which one of the users is using services. For example, one user could be receiving downloadable audio files over the packet switched network 110 from one of the devices 104a-104c while another user could be sending electronic pictures over the wireless communications network 120 from another one of the devices 104a-104c.

Communication services may be provided to one or more of the user devices 104a-104c by one or more service providers. For example, a service provider may provide the user device 104a access to the packet switched network 110. The service provider may, for example, provide Internet service via a digital subscriber line (DSL) or a cable modem. The amount of time that the user device 104a accesses the packet switched network 110 may be monitored by the packet switched usage monitoring system 112 as a measurement of service use. The user device 104a can obtain other services from the same or a different service provider during its access to the packet switched network 110. For example, the user device 104a can access audio or video media (e.g., MP3 and JPEG files) from a particular website provided by another service provider that provides this service over the packet switched network 110. Another service provider may provide access to the packet switched network 110. As described above, the usage of services via the packet switched network 110 can be monitored by the packet switched usage monitoring system 112 or by other usage monitoring systems.

Figure 2:
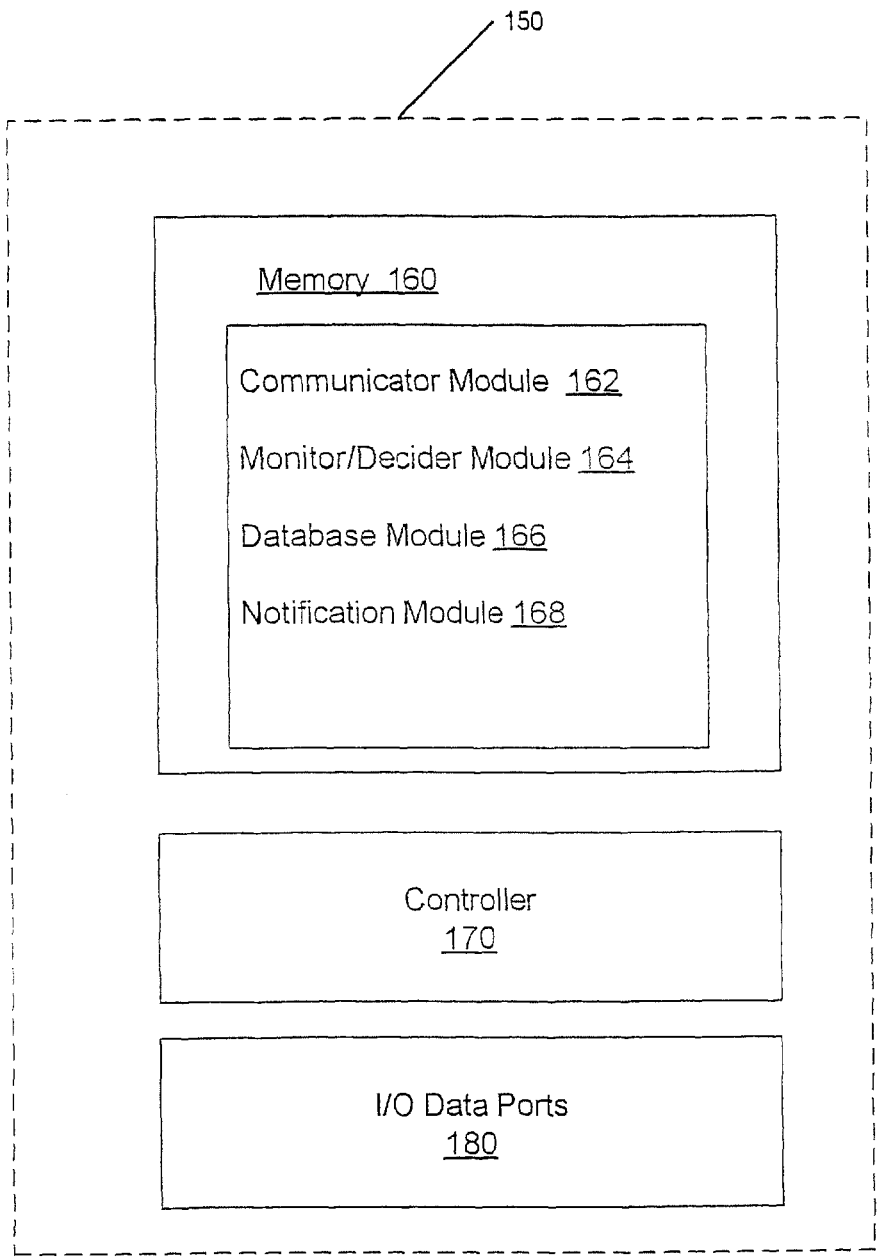
FIG. 2 is a block diagram of the combined usage monitoring system of FIG. 1.

As illustrated in FIG. 2, the combined usage monitoring system 150 can be a data processing system that includes a memory module 160, a controller module 170, and I/O data ports 180. The controller module 170 may be an operating system suitable for use with a data processing system, such as Windows95, Windows98, Windows2000, Windows NT, Windows ME, Windows XP from Microsoft Corporation, Cisco IOS, VxWorks, Unix, Linux, OS/2, AIX or System390 from International Business Machines Corporation, Armonk, N.Y. Although the controller module 170 is shown as separate from the memory module 160, it is to be understood that it may be at least partially within the memory module 160. The I/O data ports 180 can be used to transfer information between the combined usage monitoring system 150 the other usage monitoring systems 112, 122, and 132 and another computer system, a network, and/or a peripheral device such as a printer. These components may be conventional components such as those used in many conventional data processing systems and may be configured to operate as described herein.

The memory module 160 can include various modules for carrying out operations according to the present invention. As illustrated in FIG. 2, the memory module 160 includes a communicator module 162, a monitor/decider module 164, a database module 166, and a notification module 168. The communicator module 162 can provide a user interface for receiving the monitoring criteria from an administrator or from a user. The monitor/decider module 164 can monitor the service usage. The notification module 168 can create and/or send a message, for example, via the communicator module 162 to the user when the monitoring criteria is satisfied. In some embodiments, the notification module 168 can send the notification when the user initiates a service, for example, before charges for services are incurred by the user. The database module 166 can store information, such as the monitoring criteria, set(s) of rules to be taken if monitoring criteria are met, and/or actual service usage information, e.g., as received from the usage monitoring systems 112, 122, and 124.

Although the combined usage monitoring system 150 is illustrated in FIGS. 1 and 2 as being separate from the networks 110, 120 and 130, and the billing systems 112, 122, and 132, operations performed by the combined usage monitoring system 150 can be performed at least in part by other modules in the networks 110, 120, and 130, such as by one of the usage monitoring systems 112, 122, and 132.

Figure 3:
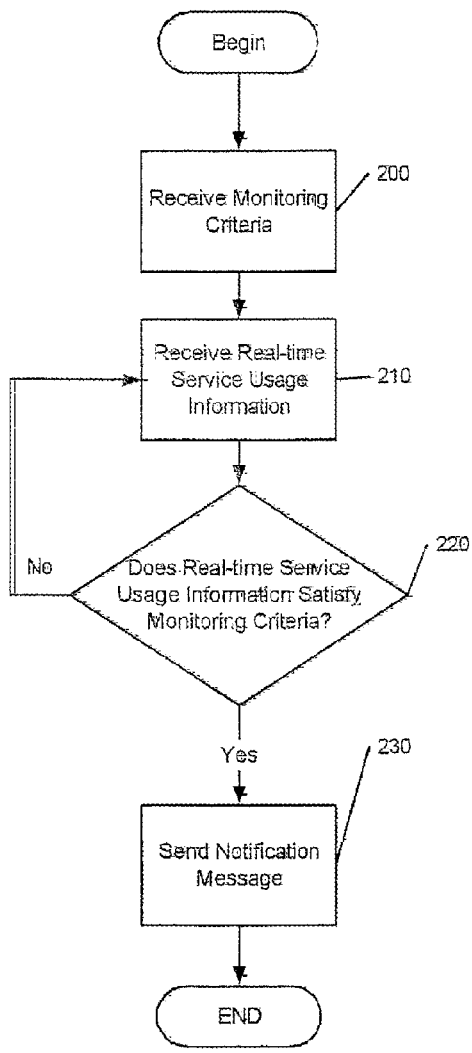
FIGS. 3-4 are flowcharts illustrating operations according to embodiments of the present invention.
Figure 4:
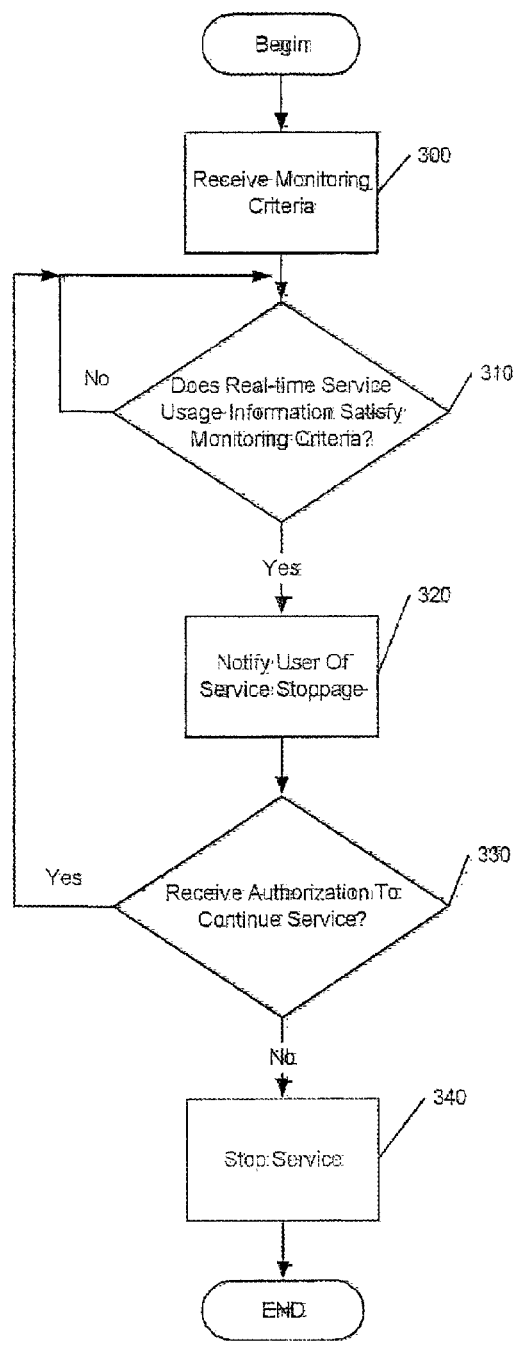

Operations according to some embodiments of the present invention are illustrated with respect to FIGS. 3 and 4. Although such operations are described with respect to FIGS. 1 and 2, it should be understood that any suitable device and/or system may be used to carry out the operations described herein.

With reference to FIGS. 1-3, the combined usage monitoring system 150 can receive monitoring criteria corresponding to a usage quantity for a plurality of services (Block 200). For example, the user can send monitoring criteria to the usage monitoring system 150, such as from the user device 104a. The communicator module 162 of the monitoring system 150 can provide a user interface, such as a web page, through which the user can input the monitoring criteria. Each of the services can be provided over one of a plurality of different communication systems, such as various services received by the user device 104a through two or more of the packet switched network 110, the wireless communications network 120 and/or the public switched telephone network 130.

The combined usage monitoring system 150 can receive substantially real-time actual service usage information from a plurality of usage monitoring systems (Block 210). For example, the monitor/decider module 164 and/or the database module 166 can receive substantially real-time usage information from the packet switched usage monitoring system 112, the wireless network usage monitoring system 122, and/or the PSTN usage monitoring system 132. The monitor/decider module 164 can compare the real-time actual service usage information and the monitoring criteria to determine if the real-time service usage information satisfies the monitoring criteria (Block 220). The notification module 168 of the combined usage monitoring system 150 can send a notification message when the monitoring criteria for one or more of the plurality of services is satisfied (Block 230). The notification message can be sent to one of the user devices 104a-104c, for example, by an email message, a text message (such as on a handheld wireless communications device or computer terminal, including "pop-up" windows), an audio indication within an ongoing telephone call, and/or a page to a pager device. The notification may be sent automatically without requiring an action by the user. Audio and/or visual notification messages may be used. In some embodiments, the notification message includes actual usage information for one or more of the services, and may indicate remaining balance(s) associated with an account. Multiple notification messages may also be sent. In some embodiments, a notification message may also be sent to a monitoring system or to a provider of a monitored service. Different notification messages may contain different information, and may be used for different purposes.

Any suitable monitoring criteria can be used. The monitoring criteria can be a threshold for an amount of service or service charge, such as a number of per-use invocations (e.g., number of media files downloaded), a maximum monthly charge, a number of minutes of use, or an amount of data (e.g., bytes) transferred. In some embodiments, multiple threshold levels may be set; for example, a warning notification message can be sent at a lower threshold and service may be stopped at a higher threshold. The monitoring criteria may be defined as a value relative to another value, such as the previous usage of the customer during a selected billing period or averaged over a set of billing periods. As another example, the monitoring criteria for service used by one member of a household or business entity sharing an account can be a threshold amount set relative to the usage of another member. The monitoring criteria can also be based on a minimum or maximum rate or speed at which the services are used. The monitoring criteria can also take into account the amount of service being used during a particular period during a billing cycle. For example, the monitoring criteria can be a threshold that depends on the amount of time that has passed during the billing cycle. Thus, the monitoring criteria can be an absolute amount of service used or an amount that, for example, increases throughout the billing cycle. As a specific example, the monitoring criteria can be a threshold of a predetermined number of units of service accumulated and/or a predetermined number of units of service per day or week of the billing cycle. The monitoring criteria can include combined criteria for more than one type of service or threshold. The amount of services accumulated may be reset for each billing cycle. The monitoring criteria can be based on any definable mathematical formula which incorporates one or more of the above example types, in any useful combination.

In some embodiments, the monitoring criteria can be based on past usage patterns. The monitoring criteria can be divided by the billing period or sub-periods within the billing period. Each period or sub-period can be categorized and/or the service use during the period or sub-period. The periods and/or sub-periods can have different monitoring criteria. For example, if a user typically uses more services in the first week of the billing cycle and very few minutes in the last week of the billing cycle, then the monitoring criteria can correspond to the expected usage. Warning messages can be provided to give users notification when they are using services more rapidly, for example, based on the actual rate of service use.

The monitoring criteria can be an amount of usage for one or more of the users in a user group, such as a household or business unit that shares a billing account. In some embodiments, the monitoring criteria can be an amount of usage associated with one or more of the devices 104a-104c. The devices 104a-104c can be associated with particular users in the user group, for example, by being pre-configured to be so associated with a user or via other associations such as user identifiers and accounts. One or more of the users in the user group can be designated as an "administrative user." When services are used at one of the user devices 104a-104c, the user device 104a-104c can send an identifier to the appropriate usage monitoring device 112, 122, and 132, and the service usage can be associated with a particular one of the user devices 104a-104c and/or a user that is assigned to the device. In some embodiments, the user can enter a user identifier so that the usage monitoring devices 112, 122, and 132 can assign the usage to a particular user. Thus, one user in a user group can use one or more of the user devices 104a-104c, for instance by logging into their user account by entering their user identifier and/or password, or by authenticating themselves via other methods well-known in the art.

The combined usage monitoring system 150 can be programmed to accept changes to the monitoring criteria and/or to override an action triggered by the satisfaction of one of the monitoring criteria based on instructions from an authorized user, such as an administrative user in a user group. The administrative user can use a password or user identification, or other acceptable authentication method, to notify the combined usage monitoring system 150 that the instructions are authorized for acceptance.

The notification message can include information about the real-time actual service usage and/or the monitoring criteria. The substantially real-time actual service usage information can include information about a single user, a sum of the usage of a group of users, such as a group of users sharing the same account, or a sub-group of those users, or the individual usage amounts for a group of users. The actual usage information can include amounts for ones of the plurality of services or a sum of the usage corresponding to one or more of the services. The notification message can include a command or request for subsequent denial of service and/or notification of service stoppage.

The notification message can include information about actions that may be taken based on the satisfaction of the monitoring criteria. For example, the notification message can inform the user that one or more of the services may be discontinued or temporarily discontinued for a period of time. In some embodiments, a notification may be a request for a particular service provider to deny subsequent service usage with respect to a user group, sub-group, or individual user.

For example, as illustrated in FIG. 4, the monitoring criteria is received, for example, by the combined usage monitoring system 150 (Block 300). The monitoring criteria can include an instruction to stop services if the user uses more than a predetermined amount of service. If, for example, the monitor decider module 164, determines that the real-time service usage information satisfies the monitoring criteria, e.g., by surpassing an amount of service use (Block 310), then the notification module 168 sends a message to the user notifying the user that service will be stopped (Block 320).

In some embodiments, the user (or one or more of the users in a user group) may have the authority to override a service stoppage. If the communicator module 162 receives authorization to continue services, then the service is not discontinued (Block 330). If authorization is not received, then one or more of the services are discontinued (Block 340). The services may be permanently discontinued, or services may resume after a period of time or at the beginning of the next billing cycle. The services may be stopped by automatically disabling a service account, or by transmitting a message or command to a service provider to stop providing services to the user.

Although the notification message is described herein as including information about actual service usage or service stoppages, other information may be included in the notification message. For example, advertisements or promotions for service billing plans may be automatically sent to selected users, such as users who exceed a threshold of service use or users who use below a threshold of service use. Users may also receive advertisements or promotions for additional services in the notification message. More than one notification message may be sent.

Other actions may also be taken if the actual service usage satisfies the monitoring criteria. For example, when the actual service usage reaches a threshold amount, the user may be temporarily or indefinitely moved to a new billing plan. Some service providers may provide services based on the amount of service used, e.g., a rate for some predetermined amount of service and a higher or lower amount for service exceeding the predetermined amount. Thus, users may be charged different amounts based on a particular service billing plan. The user may be automatically moved to a new billing plan or the user may receive information regarding billing plan options that may be more economical based on the user's actual service.

In the drawings and specification, there have been disclosed certain embodiments of the invention and, although specific terms are employed, they are used in a generic and descriptive sense only and not for purposes of limitation, the scope of the invention being set forth in the following claims.

The invention claimed is:

1. A method, comprising:
   receiving, by a processor, electronic usage information describing different services utilized by a communications device, the different services provided by a communications network;
   generating, by the processor, a combined usage of the different services utilized by the communications device;
   retrieving, by the processor, a monitoring criterion associated with the communications device, the monitoring criterion associated with a threshold at which additional charges are incurred;
   comparing, by the processor, the combined usage of the different services to the monitoring criterion;
   determining, by the processor, that the combined usage satisfies the monitoring criterion; and
   sending, from the processor, an electronic message via the communications network to an address associated with the communications device, the electronic message alerting of the additional charges.

2. The method of claim 1, further comprising sending a text message to the address associated with the communications device.

3. The method of claim 1, further comprising including the combined usage in the electronic message.

4. The method of claim 1, further comprising including balance information in the electronic message.

5. The method of claim 1, further comprising determining an amount of data sent to the address associated with the communications device.

6. The method of claim 5, further comprising determining the amount of data is less than the monitoring criterion.

7. The method of claim 5, further comprising determining the amount of data exceeds the monitoring criterion.

8. A system, comprising:
   a processor; and
   a memory storing instructions that when executed cause the processor to perform operations, the operations comprising:
   receiving electronic usage information describing different services in a network utilized by a group of devices associated with a shared account;
   generating a combined usage of the different services utilized by the group of devices;
   retrieving a monitoring criterion associated with a threshold at which additional charges are incurred;
   comparing the monitoring criterion to the combined usage of the different services utilized by the group of devices;
   determining that the combined usage of the different services utilized by the group of devices at least equals the monitoring criterion; and
   sending an electronic message via the network to a network address associated with at least one device in the group of devices, the electronic message alerting of the additional charges incurred.

9. The system of claim 8, wherein the operations further comprise sending the electronic message to each device in the group of devices.

10. The system of claim 8, wherein the operations further comprise sending the electronic message to multiple devices in the group of devices.

11. The system of claim 8, wherein the operations further comprise sending a text message as the electronic message.

12. The system of claim 8, wherein the operations further comprise including the combined usage in the electronic message.

13. The system of claim 8, wherein the operations further comprise including a balance in the electronic message.

14. The system of claim 8, wherein the operations further comprise including data transferred in the electronic message.

15. A memory device storing code that when executed causes a processor to perform operations, the operations comprising:
   receiving electronic usage information describing different data services utilized by a group of devices accessing a network, the group of devices associated with a shared account;
   generating a combined usage of the different data services utilized by the group of devices;
   retrieving a monitoring criterion associated with a threshold at which additional charges are incurred;
   comparing the monitoring criterion to the combined usage of the different data services utilized by the group of devices;
   determining that the combined usage at least equals the monitoring criterion; and
   sending an electronic message via the network to a network address associated with at least one device in the group of devices, the electronic message alerting of the additional charges incurred.

16. The memory device of claim 15, wherein the operations further comprise sending the electronic message to each device in the group of devices.

17. The memory device of claim 15, wherein the operations further comprise sending the electronic message to multiple devices in the group of devices.

18. The memory device of claim 15, wherein the operations further comprise sending a text message as the electronic message.

19. The memory device of claim 15, wherein the operations further comprise including the combined usage in the electronic message.

20. The memory device of claim 15, wherein the operations further comprise including a balance in the electronic message.

* * * * *